(12) United States Patent
Urbanski et al.

(10) Patent No.: US 10,006,700 B2
(45) Date of Patent: Jun. 26, 2018

(54) ACCUMULATION AND MELT TRAY ASSEMBLY FOR A DISTILLATION TOWER

(71) Applicants: Nicholas F. Urbanski, Katy, TX (US); Brandon Cassimere, Houston, TX (US); Robert D. Denton, Bellaire, TX (US); Wayne S. Pon, Calgary (CA)

(72) Inventors: Nicholas F. Urbanski, Katy, TX (US); Brandon Cassimere, Houston, TX (US); Robert D. Denton, Bellaire, TX (US); Wayne S. Pon, Calgary (CA)

(73) Assignee: ExxonMobil Upstream Research Company, Spring, TX (US)

( * ) Notice: Subject to any disclaimer, the term of this patent is extended or adjusted under 35 U.S.C. 154(b) by 175 days.

(21) Appl. No.: 14/944,941

(22) Filed: Nov. 18, 2015

(65) Prior Publication Data

US 2016/0187061 A1 Jun. 30, 2016

Related U.S. Application Data

(60) Provisional application No. 62/097,933, filed on Dec. 30, 2014.

(51) Int. Cl.
*F25J 1/00* (2006.01)
*F25J 3/02* (2006.01)
(Continued)

(52) U.S. Cl.
CPC ............ *F25J 3/0295* (2013.01); *B01D 3/008* (2013.01); *B01D 3/205* (2013.01); *F25J 3/0209* (2013.01); *F25J 3/0233* (2013.01); *F25J 3/0266* (2013.01); *F25J 2200/02* (2013.01); *F25J 2200/30* (2013.01); *F25J 2200/50* (2013.01); *F25J 2200/74* (2013.01); *F25J 2200/90* (2013.01);
(Continued)

(58) Field of Classification Search
CPC .... F25J 3/067; F25J 3/0266; F25J 3/08; F25J 2280/40; B01D 3/20; B01D 3/205
See application file for complete search history.

(56) References Cited

U.S. PATENT DOCUMENTS 3,599,006 A * 8/1971 Harris ................. G05B 19/063
200/39 R
4,305,895 A 12/1981 Heath et al.
(Continued)

OTHER PUBLICATIONS

U.S. Appl. No. 14/643,726, P.S. Northrop.
(Continued)

*Primary Examiner* — Brian King
(74) *Attorney, Agent, or Firm* — ExxonMobil Upstream Research Company Law Department

(57) ABSTRACT

The disclosure includes techniques associated with a collector tray assembly for a cryogenic distillation tower disposed below a slurry mix zone and above a lower distillation zone, wherein the collector tray assembly comprises a deck at a lower end of the slurry mix zone, and wherein the deck comprises at least one vapor riser configured to pass the vapor from the lower distillation zone into the slurry mix zone, wherein the vapor riser comprises a substantially vertical heat transfer section configured to pass the vapor substantially upwards through the slurry mix zone, and a vapor outlet section comprising at least one vapor outlet, wherein the vapor outlet section is below the heat transfer section.

17 Claims, 7 Drawing Sheets

(51) Int. Cl.
  *B01D 3/00* (2006.01)
  *B01D 3/20* (2006.01)
(52) U.S. Cl.
  CPC ........ *F25J 2205/04* (2013.01); *F25J 2205/20* (2013.01); *F25J 2280/40* (2013.01); *Y02C 10/12* (2013.01)

(56) References Cited

U.S. PATENT DOCUMENTS

| | | | | |
|---|---|---|---|---|
| 4,533,372 | A | * | 8/1985 | Valencia ................ F25J 3/0209 62/629 |
| 4,578,153 | A | * | 3/1986 | Newton ................... B01D 3/18 202/158 |
| 4,923,493 | A | | 5/1990 | Valencia et al. ................... 62/13 |
| 5,062,270 | A | | 11/1991 | Haut et al. ......................... 62/12 |
| 5,120,338 | A | | 6/1992 | Potts, Jr. et al. ................... 62/12 |
| 5,152,967 | A | * | 10/1992 | Rossetti ............... B01F 5/0602 239/543 |
| 5,265,428 | A | * | 11/1993 | Valencia .................. B01D 3/18 202/158 |
| 5,620,144 | A | | 4/1997 | Strock et al. ................. 239/557 |
| 5,956,971 | A | | 9/1999 | Cole et al. ...................... 62/623 |
| 6,053,007 | A | | 4/2000 | Victory et al. .................. 62/619 |
| 6,565,629 | B1 | | 5/2003 | Hayashida et al. ............. 95/211 |
| 2008/0034789 | A1 | | 2/2008 | Fieler et al. .................... 62/623 |
| 2009/0266107 | A1 | | 10/2009 | Singh et al. .................... 62/617 |
| 2010/0018248 | A1 | * | 1/2010 | Fieler ..................... F25J 3/0209 62/617 |
| 2010/0107687 | A1 | | 5/2010 | Andrian et al. ................. 62/620 |
| 2012/0031144 | A1 | | 2/2012 | Northrop et al. ............... 62/617 |
| 2012/0079852 | A1 | | 4/2012 | Northrop et al. ............... 62/620 |
| 2012/0125043 | A1 | | 5/2012 | Cullinane et al. .............. 62/620 |
| 2012/0204599 | A1 | | 8/2012 | Northrop et al. ............... 62/617 |
| 2012/0279728 | A1 | | 11/2012 | Northrop et al. ............. 166/401 |
| 2013/0074541 | A1 | | 3/2013 | Kaminsky et al. ......... F25J 1/00 |
| 2013/0098105 | A1 | * | 4/2013 | Northrop ................ C10L 3/102 62/617 |
| 2014/0137599 | A1 | | 5/2014 | Oelfke et al. ............ F25J 3/069 |
| 2014/0338395 | A1 | | 11/2014 | Oelfke et al. ....... B01D 53/1418 |
| 2015/0013377 | A1 | | 1/2015 | Oelfke ................... F25J 1/0027 |
| 2015/0158796 | A1 | | 6/2015 | Valencia ................... C07C 7/05 |
| 2015/0159939 | A1 | | 6/2015 | Valencia ................ F25J 1/0022 |
| 2015/0159940 | A1 | | 6/2015 | Valencia et al. ........ F25J 1/0022 |
| 2015/0159941 | A1 | | 6/2015 | Valencia et al. ....... F25J 3/0209 |
| 2015/0159942 | A1 | | 6/2015 | Valencia et al. ....... F25J 3/0209 |
| 2015/0159943 | A1 | | 6/2015 | Valencia et al. ....... F25J 3/0233 |
| 2015/0159944 | A1 | | 6/2015 | Valencia et al. ........... F25J 3/08 |
| 2015/0159945 | A1 | | 6/2015 | Valencia et al. ........... F25J 3/08 |
| 2015/0159946 | A1 | | 6/2015 | Valencia ................... F25J 3/08 |
| 2015/0159947 | A1 | | 6/2015 | Valencia et al. ........... F25J 3/08 |

OTHER PUBLICATIONS

U.S. Appl. No. 14/661,621, J.A. Valencia.
U.S. Appl. No. 14/688,786, R.H. Oelfke.
U.S. Appl. No. 14/700,993, Northrop et al.
U.S. Appl. No. 14/848,716, N.F. Urbanski.
U.S. Appl. No. 14/876,146, Denton et al.

* cited by examiner

ACCUMULATION AND MELT TRAY ASSEMBLY FOR A DISTILLATION TOWER

CROSS REFERENCE TO RELATED APPLICATIONS

This application claims the priority benefit of U.S. Provisional Patent Application No. 62/097,933 filed Dec. 30, 2014 entitled ACCUMULATION AND MELT TRAY ASSEMBLY FOR A DISTILLATION TOWER, the entirety of which is incorporated by reference herein.

BACKGROUND

Fields of Disclosure

The disclosure relates generally to the field of fluid separation. More specifically, the disclosure relates to a method and system of controlling a temperature within a melt tray assembly of a distillation tower.

Description of Related Art

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as admissions of prior art.

The production of natural gas hydrocarbons, such as methane and ethane, from a reservoir often carries with it the incidental production of non-hydrocarbon gases. Such gases include contaminants, such as at least one of carbon dioxide ("$CO_2$"), hydrogen sulfide ("$H_2S$"), carbonyl sulfide, carbon disulfide, and various mercaptans. When a stream being produced from a reservoir includes these contaminants mixed with hydrocarbons, the stream is oftentimes referred to as "sour gas."

Many natural gas reservoirs have relatively low percentages of hydrocarbons and relatively high percentages of contaminants. Contaminants may act as a diluent and lower the heat content of the produced hydrocarbon stream. Some contaminants, like sulfur-bearing compounds, can also be noxious and, in the presence of liquid water, some contaminants can be corrosive to carbon steel. Therefore, it is desirable to remove contaminants from a stream containing hydrocarbons to produce sweet and concentrated hydrocarbons.

Specifications for pipeline quality natural gas typically call for a maximum of 2-4% $CO_2$ and ¼ grain $H_2S$ per 100 standard cubic feet (scf) (4 parts per million volume (ppmv)) or 5 milligrams per Normal meter cubed (mg/$Nm^3$) $H_2S$. Specifications for lower temperature processes such as natural gas liquefaction plants or nitrogen rejection units typically require less than 50 parts per million (ppm) $CO_2$.

The separation of contaminants from hydrocarbons is difficult and consequently significant work has been applied to the development of hydrocarbon/contaminant separation methods. These methods can be placed into three general classes: absorption by solvents (e.g., physical, chemical, and hybrids), adsorption by solids, and distillation.

Separation by distillation of some gas mixtures can be relatively simple and, as such, is often widely used in the natural gas industry. However, distillation of mixtures of natural gas hydrocarbons, primarily methane, and one of the most common contaminants in natural gas, carbon dioxide, can present significant difficulties. Conventional distillation principles and conventional distillation equipment are predicated on the presence of only vapor and liquid phases throughout the distillation tower. The separation of $CO_2$ from methane by distillation involves temperature and pressure conditions that result in solidification of $CO_2$ if pipeline quality or better hydrocarbon product is desired. The required temperatures are cold temperatures typically referred to as cryogenic temperatures.

Certain cryogenic distillations can overcome the above mentioned difficulties. These cryogenic distillations provide the appropriate mechanism to handle the formation and subsequent melting of solids during the separation of solid-forming contaminants from hydrocarbons. The formation of solid contaminants in equilibrium with vapor-liquid mixtures of hydrocarbons and contaminants at particular conditions of temperature and pressure takes place in a controlled freeze zone section of a distillation tower.

The controlled freeze zone section comprises a melt tray assembly. The melt tray assembly collects and warms solids that form in the controlled freeze zone section. Liquid in the melt tray assembly helps conduct heat to warm the solids and create a liquid slurry. This liquid and/or the liquid slurry may alternately be referred to herein as a liquid bath. The melt tray assembly provides adequate heat transfer to melt the solids and facilitate liquid slurry draw-off to a stripper section of the distillation tower.

Maintaining the liquid bath in the melt tray assembly at a generally uniform and/or steady-state conditions is important for overall process stability within the distillation tower. Too high of a temperature can result in decreased separation performance of the contaminants from the stream containing the hydrocarbons in the controlled freeze zone section, which in turn can result in higher contaminant content in the stream flowing through a rectifier section of the distillation tower and/or can lead to solid formation in the rectifier section. Solid formation in the rectifier section can cause a disruption within the distillation process and prevent adequate removal of the contaminants from the stream. Too low of a temperature can result in solid formation in the melt tray assembly, which can stop flow of the liquid slurry into the stripper or lower distillation section, thereby disrupting operation within the distillation process. An unsteady melt tray assembly temperature can negatively affect the rate of removal of contaminants from the stream in the controlled freeze zone section. The purity of the hydrocarbons sold may be detrimentally affected. Operation costs of the distillation process may increase.

The melt tray heat exchange device is used to facilitate the warming of the solids, formed by a spray assembly in the controlled freeze zone section, in the melt tray assembly. Conventional controlled freeze zone sections comprise a melt tray assembly with a melt tray heat exchange device having coils of tubing designed to pass a warm heat medium fluid into the liquid bath across a substantial portion of the liquid bath. Some designs include vapor risers with a bubble cap at an upper end an example of which is described in U.S. Pat. No. 5,265,428, incorporated herein by reference.

Disadvantages can result when using the above described approaches. For example, the above described approaches can develop pockets within the liquid bath with relatively higher or lower temperatures or otherwise can make it difficult to obtain generally uniform heat transfer within the melt tray assembly. In designs releasing vapor into the bottom of the liquid bath, misdistribution of the warm vapor bubbles entering the bottom of the liquid bath across its available volume reduces the liquid bath's thermal effectiveness to maintain a constant temperature that will effectively and evenly melt collected solid material. Additionally, bubble cap designs contain a surface that is ineffective for heat transfer, namely, an inner wall of the vapor riser.

A need exists for improved technology that can better facilitate heat transfer within the melt tray assembly and/or liquid bath, that effectively mixes warm vapor across the available liquid bath volume, that increases the effectiveness of and/or more efficiently utilizes the available surface area between the vapor riser and the liquid bath, that reduces the compartmentalization of heat supplied to the liquid bath, and/or that minimizes the lateral temperature differential within the melt tray assembly and/or liquid bath.

SUMMARY

The present disclosure provides a method and system for an accumulation and melt tray assembly for a cryogenic distillation tower.

The disclosure includes a cryogenic distillation tower system for separating acid gases from hydrocarbons in a raw gas stream, comprising a controlled freezing zone configured to separate the raw gas stream into an overhead methane gas stream and a substantially solid material comprised of precipitated carbon dioxide; a lower distillation zone configured to receive a bottoms stream comprising acid gases in liquid phase, and further configured to pass a vapor separated from the acid gases, wherein the acid gas comprises carbon dioxide, hydrogen sulfide, ethane, propane, butane, hydrogen sulfide, aromatic hydrocarbons, or combinations thereof, in substantially liquid phase; a slurry mix zone below the controlled freezing zone configured to house a liquid bath comprising the melt from the melted substantially solid material, and wherein the slurry mix zone is further configured to receive the substantially solid material, and a collector tray assembly below the slurry mix zone and above the lower distillation zone, wherein the collector tray assembly comprises a deck at a lower end of the slurry mix zone, and wherein the deck comprises at least one vapor riser configured to pass the vapor from the lower distillation zone into the slurry mix zone, wherein the vapor riser comprises a substantially vertical heat transfer section configured to pass the vapor substantially upwards through the slurry mix zone, and a vapor outlet section comprising at least one vapor outlet, wherein the vapor outlet section is below the heat transfer section.

The disclosure further includes a method for separating acid gases from a raw gas feed stream in a cryogenic distillation tower, comprising passing a feed stream into a controlled freeze zone section of a distillation tower, the feed stream comprising a hydrocarbon and a contaminant, contacting the freezing zone vapor stream in the controlled freeze zone section with a freezing zone liquid stream, comprising the hydrocarbon, at a temperature and pressure at which a solid, comprising the contaminant, and a hydrocarbon-enriched vapor stream, comprising the hydrocarbon, form, passing the solid into a liquid bath section of the distillation tower, wherein the temperature of the liquid bath is higher than the temperature of the solid, passing a vapor stream from a lower distillation section of the distillation tower into the liquid bath section, wherein the temperature of the vapor stream is higher than the temperature of the liquid bath, and wherein passing the vapor stream from the lower distillation section into the liquid bath section comprises passing the vapor stream in a substantially vertically upwards direction through the liquid bath section, wherein passing comprises exchanging heat from the vapor stream to the liquid bath section, redirecting the vapor stream to pass in a substantially vertically downwards direction through the liquid bath section, wherein passing comprises exchanging heat from the vapor stream to the liquid bath section, and sparging the vapor stream into the liquid bath section at a lower end of the liquid bath section.

The disclosure also includes a collector tray assembly for a controlled freeze zone tower, comprising a deck configured to support a liquid bath on a top side of the deck and a mixture of a vapor and a liquid on a bottom side of the deck, wherein the deck comprises a plurality of electrical heating elements, and a plurality of vapor risers, wherein each vapor riser comprises a vertical trunk configured to pass the vapor from below the deck into an upper end of the liquid bath, a vapor distribution cap disposed at a top of the vertical trunk, at least two branches coupled to the vapor distribution cap and configured to pass the vapor from the vapor distribution cap to a lower end of the liquid bath, a vapor outlet at a terminal end of each of the at least two branches, wherein the vapor outlet is configured to sparge the vapor into the liquid bath.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
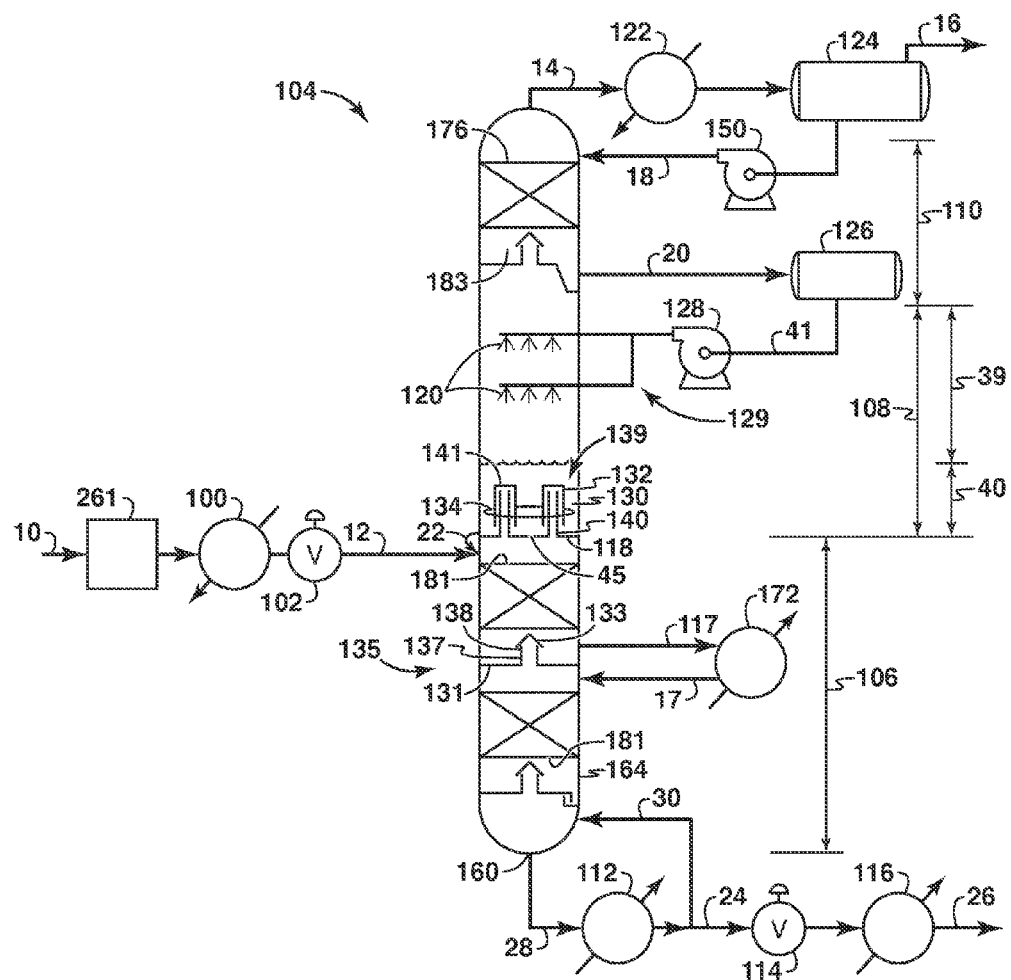
FIG. 1 is a schematic diagram of a tower with sections within a single vessel.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

At the outset, for ease of reference, certain terms used in this application and their meaning as used in this context are set forth below. To the extent a term used herein is not defined below, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

As used herein, the term "fluid" may refer to gases, liquids, and combinations of gases and liquids.

As used herein, the term "hydrocarbon fluids" may refer to a hydrocarbon or mixtures of hydrocarbons that are gases or liquids. For example, hydrocarbon fluids may include a hydrocarbon or mixtures of hydrocarbons that are gases or liquids at formation conditions, at processing conditions or at typical environmental conditions (e.g., 25° Celsius (C) and 1 atmosphere (atm) pressure). Hydrocarbon fluids may include, for example, oil, natural gas, coal bed methane, shale oil, pyrolysis oil, pyrolysis gas, a pyrolysis product of coal, and other hydrocarbons that are in a gaseous or liquid state.

The term "mass transfer device" may refer to any object that receives fluids to be contacted, and passes those fluids to other objects, such as through gravitational flow.

As used herein, the term "subsurface" refers to geologic strata occurring below the earth's surface.

The terms "substantial," "substantially," "generally," "approximate," and "about" when used in reference to a quantity or amount of a material, or a specific characteristic thereof, refer to an amount that is sufficient to provide an effect that the material or characteristic was intended to provide.

As referenced in this application, the terms "stream," "gas stream," "vapor stream," and "liquid stream" may refer to different stages of a feed stream as the feed stream is processed in a distillation tower that separates methane, the primary hydrocarbon in natural gas, from contaminants. Although the phrases "gas stream," "vapor stream," and "liquid stream," refer to situations where a gas, vapor, and liquid is mainly present in the stream, respectively, there may be other phases also present within the stream. For example, a gas may also be present in a "liquid stream." In some instances, the terms "gas stream" and "vapor stream" may be used interchangeably.

A "flow controlling device" may refer to any suitable device that can control pressure and flow. A flow controlling device being "open" refers to the flow controlling device being anywhere from partially open to completely open.

The articles "the", "a" and "an" are not necessarily limited to mean only one, but rather are inclusive and open ended so as to include, optionally, multiple such elements.

"At least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, to at least one, optionally including more than one, A, with no B present (and optionally including entities other than B); to at least one, optionally including more than one, B, with no A present (and optionally including entities other than A); to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The disclosure relates to an accumulation and melt tray assembly for a distillation tower and a method of producing hydrocarbons. Disclosed techniques include a sparging system for sparging vapor from a lower distillation section through a liquid/slurry mix or liquid bath in order to promote tumultuous flow, transfer heat from the vapor to the liquid/slurry mix or liquid bath. The techniques may also create a laterally uniform heating profile and effectively utilize available heat transfer surfaces. Disclosed techniques include utilizing downwardly-extending branching arms at the top of a vapor riser trunk, thereby permitting heat transfer along both the full length of the vapor riser trunk as well as along the branch arms. Various branching arm embodiments laterally space terminal sparging vapor outlets along the available horizontal volume of the distillation tower. Some embodiments utilize directional vapor outlets to direct the vapor along the available volume of the distillation tower, to create eddies or otherwise promote swirling, non-linear flow, tumultuous flow, etc. Some embodiments include various surface features along an inner riser surface, an outer riser surface, or both in order to promote heat transfer. Still other embodiments vary the diameter of the vapor riser trunk, branching arms, or both in order to obtain the desired flow characteristics. FIGS. 1-8B of the disclosure display various aspects of the associated apparatus, system, and method.

The system and method may separate a feed stream having methane and contaminants, e.g., carbon dioxide, hydrogen sulfide, ethane, propane, butane, hydrogen sulfide, aromatic hydrocarbons, or combinations thereof. The system may comprise a distillation tower 104, 204 (FIGS. 1-4). The distillation tower 104, 204 may separate the contaminants from the methane.

The distillation tower 104, 204 may be separated into three functional sections: a lower section 106, a middle controlled freeze zone section 108, and an upper section 110. The distillation tower 104, 204 may incorporate three functional sections when the upper section 110 is needed and/or desired.

The distillation tower 104, 204 may incorporate only two functional sections when the upper section 110 is not needed and/or desired. When the distillation tower does not include an upper section 110, a portion of vapor leaving the middle controlled freeze zone section 108 may be condensed in a condenser 122 and returned as a liquid stream via a spray assembly 129. Moreover, lines 18 and 20 may be eliminated, elements 124 and 126 may be one and the same, and elements 150 and 128 may be one and the same. The stream in line 14, now taking the vapors leaving the middle controlled freeze section 108, directs these vapors to the condenser 122.

The lower section 106 may also be referred to as a stripper section. The middle controlled freeze zone section 108 may also be referred to as a controlled freeze zone section. The upper section 110 may also be referred to as a rectifier section.

Figure 3:
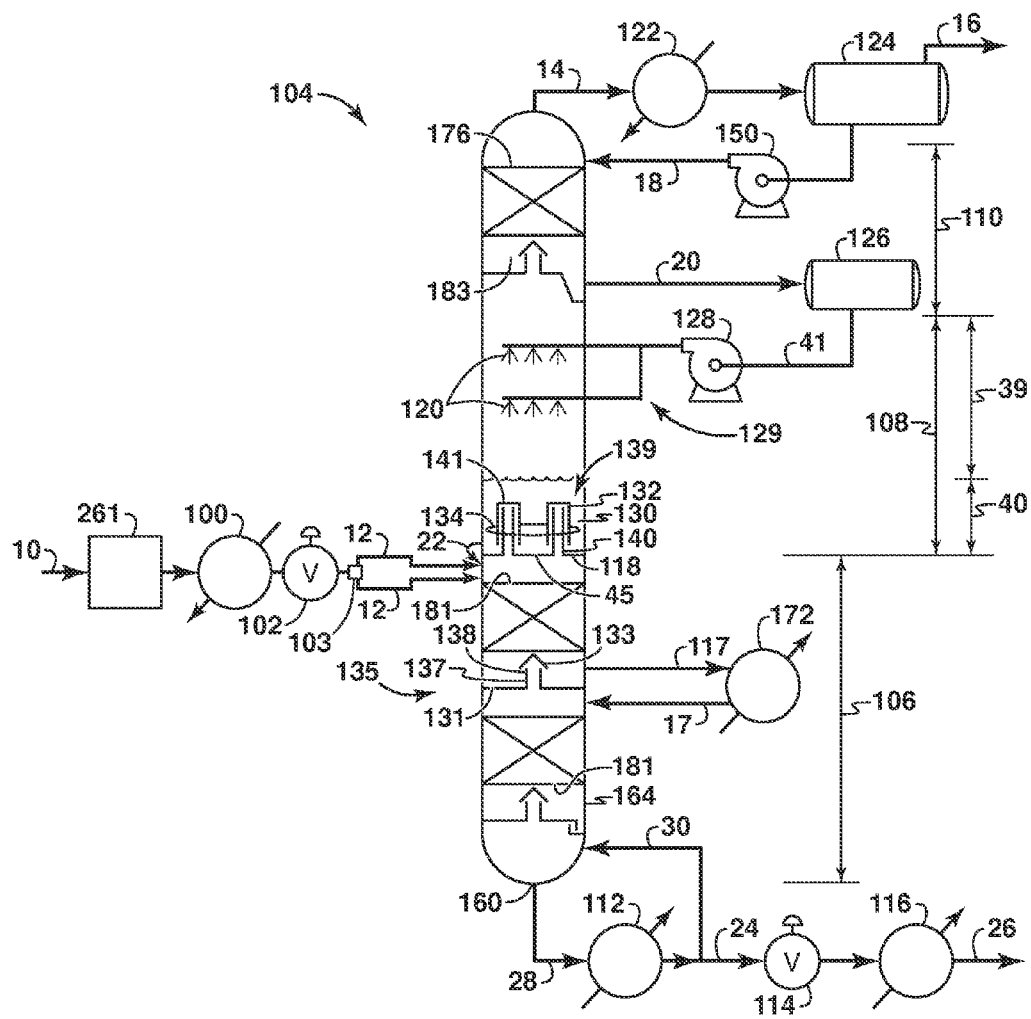
FIG. 3 is a schematic diagram of a tower with sections within a single vessel.

The sections of the distillation tower 104 may be housed within a single vessel (FIGS. 1 and 3). For example, the lower section 106, the middle controlled freeze zone section 108, and the upper section 110 may be housed within a single vessel 164.

Figure 2:
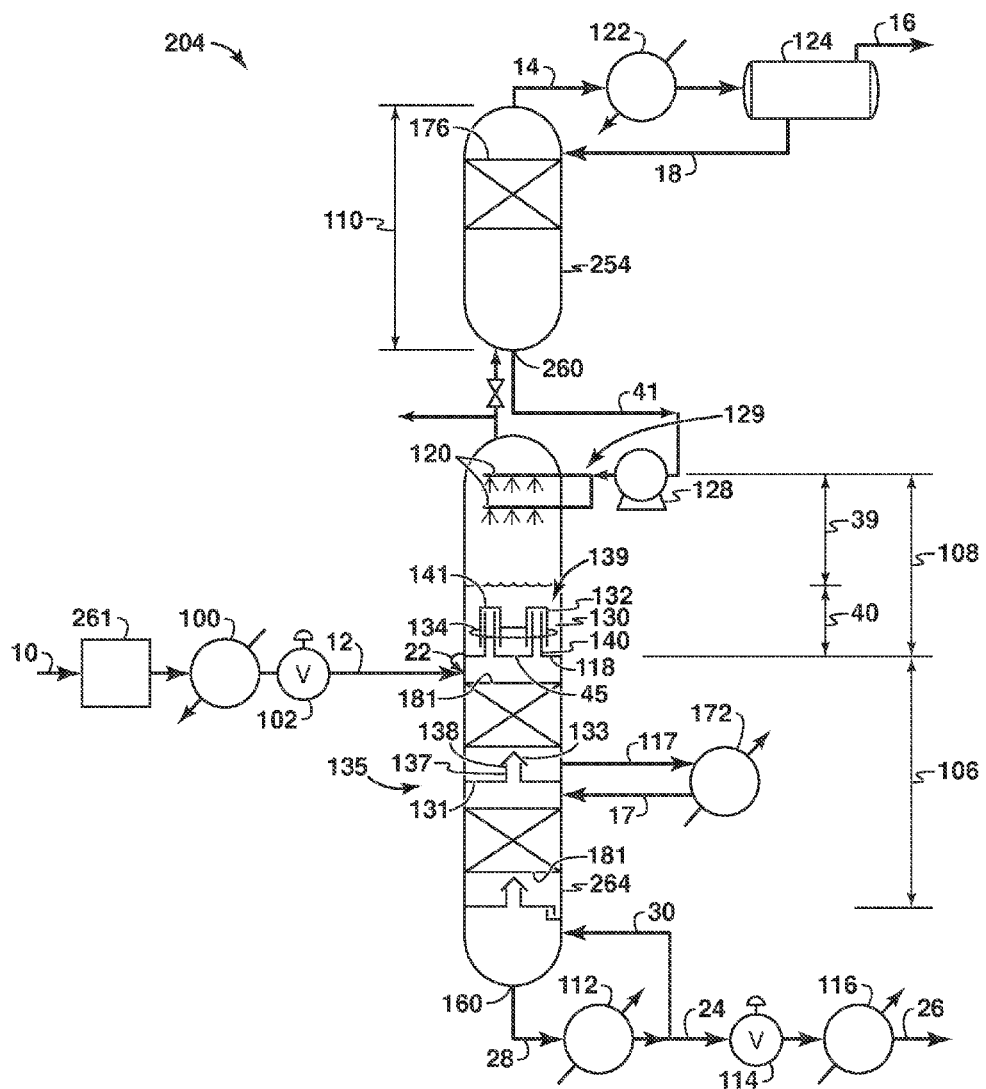
FIG. 2 is a schematic diagram of a tower with sections within multiple vessels.
Figure 4:
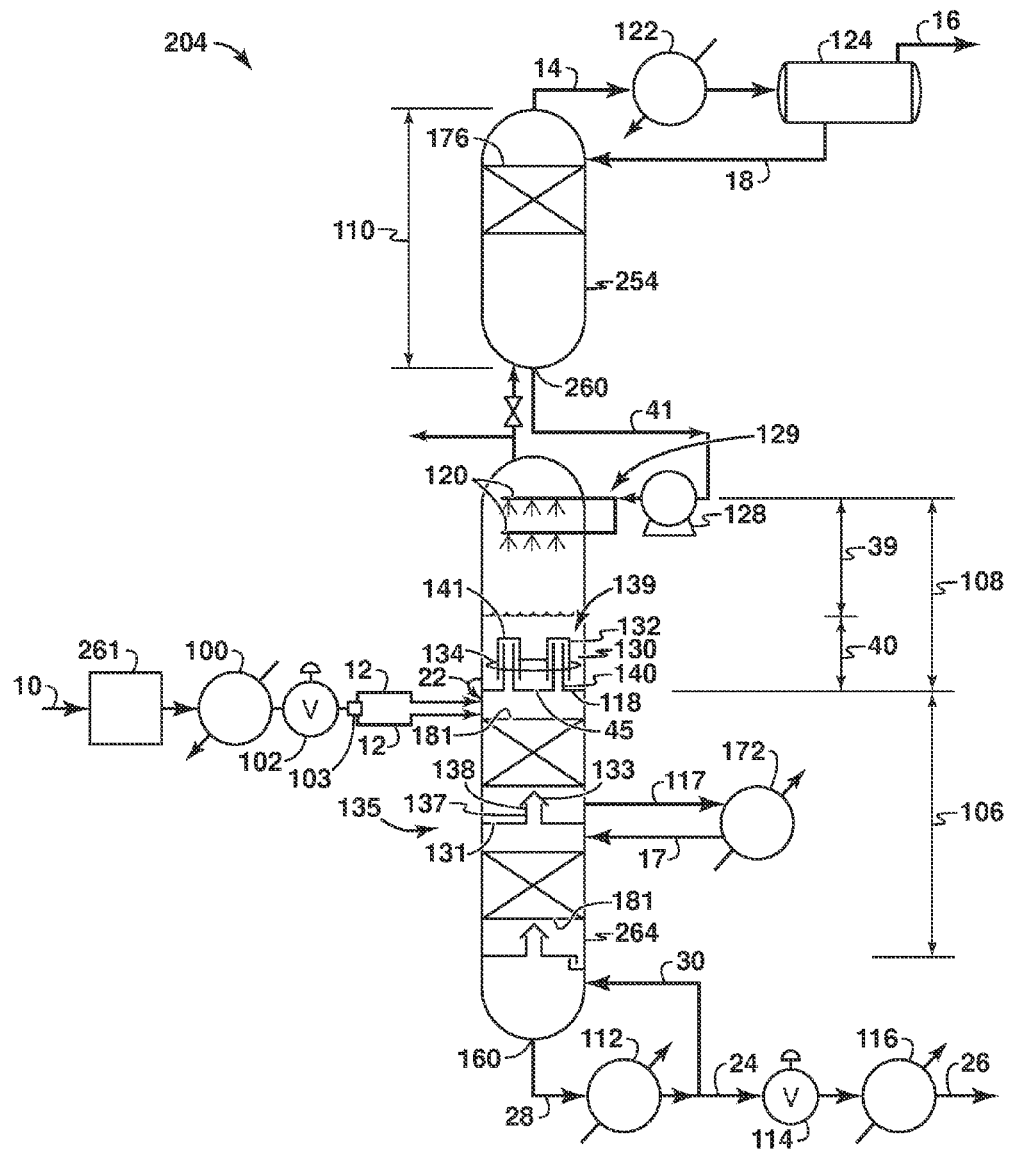
FIG. 4 is a schematic diagram of a tower with sections within multiple vessels.

The sections of the distillation tower 204 may be housed within a plurality of vessels to form a split-tower configuration (FIGS. 2 and 4). Each of the vessels may be separate from the other vessels. Piping and/or another suitable mechanism may connect one vessel to another vessel. In this instance, the lower section 106, middle controlled freeze zone section 108, and upper section 110 may be housed within two or more vessels. For example, as shown in FIGS. 2 and 4, the upper section 110 may be housed within a single vessel 254 and the lower and middle controlled freeze zone sections 106, 108 may be housed within a single vessel 264. When this is the case, a liquid stream exiting the upper section 110, may exit through a liquid outlet bottom 260. The liquid outlet bottom 260 is at the bottom of the upper section 110. Although not shown, each of the sections may be housed within its own separate vessel, or one or more section may be housed within separate vessels, or the upper and middle controlled freeze zone sections may be housed within a single vessel and the lower section may be housed within a single vessel, etc. When sections of the distillation tower are housed within vessels, the vessels may be side-by-side along a horizontal line and/or above each other along a vertical line.

The split-tower configuration may be beneficial in situations where the height of the distillation tower, motion considerations, and/or transportation issues, such as for remote locations, need to be considered. This split-tower configuration allows for the independent operation of one or more sections. For example, when the upper section is housed within a single vessel and the lower and middle controlled freeze zone sections are housed within a single vessel, independent generation of reflux liquids using a substantially contaminant-free, largely hydrocarbon stream from a packed gas pipeline or an adjacent hydrocarbon line, may occur in the upper section. And the reflux may be used to cool the upper section, establish an appropriate temperature profile in the upper section, and/or build up liquid inventory at the bottom of the upper section to serve as an initial source of spray liquids for the middle controlled freeze zone section. Moreover, the middle controlled freeze zone and lower sections may be independently prepared by chilling the feed stream, feeding it to the optimal location be that in the lower section or in the middle controlled freeze zone section, generating liquids for the lower and the middle controlled freeze zone sections, and disposing the vapors off the middle controlled freeze zone section while they are off specification with too high a contaminant content. Also, liquid from the upper section may be intermittently or continuously sprayed, building up liquid level in the bottom of the middle controlled freeze zone section and bringing the contaminant content in the middle controlled freeze zone section down and near steady state level so that the two vessels may be connected to send the vapor stream from the middle controlled freeze zone section to the upper section, continuously spraying liquid from the bottom of the upper section into the middle controlled freeze zone section and stabilizing operations into steady state conditions. The split tower configuration may utilize a sump of the upper section as a liquid receiver for the pump 128, therefore obviating the need for a liquid receiver 126 in FIGS. 1 and 3.

The system may also include a heat exchanger 100 (FIGS. 1-4). The feed stream 10 may enter the heat exchanger 100 before entering the distillation tower 104, 204. The feed stream 10 may be cooled within the heat exchanger 100. The heat exchanger 100 helps drop the temperature of the feed stream 10 to a level suitable for introduction into the distillation tower 104, 204.

The system may include an expander device 102 (FIGS. 1-4). The feed stream 10 may enter the expander device 102 before entering the distillation tower 104, 204. The feed stream 10 may be expanded in the expander device 102 after exiting the heat exchanger 100.

The expander device 102 helps drop the temperature of the feed stream 10 to a level suitable for introduction into the distillation tower 104, 204. The expander device 102 may be any suitable device, such as a valve. If the expander device 102 is a valve, the valve may be any suitable valve that may aid in cooling the feed stream 10 before it enters the distillation tower 104, 204. For example, the expander device 102 may comprise a Joule-Thomson (J-T) valve.

The system may include a feed separator 103 (FIGS. 3-4). The feed stream may enter the feed separator before entering the distillation tower 104, 204. The feed separator may separate a feed stream having a mixed liquid and vapor stream into a liquid stream and a vapor stream. Lines 12 may extend from the feed separator to the distillation tower 104, 204. One of the lines 12 may receive the vapor stream from the feed separator. Another one of the lines 12 may receive the liquid stream from the feed separator. Each of the lines 12 may extend to the same and/or different sections (i.e. middle controlled freeze zone, and lower sections) of the distillation tower 104, 204. The expander device 102 may or may not be downstream of the feed separator 103. The expander device 102 may comprise a plurality of expander devices 102 such that each line 12 has an expander device 102.

The system may include a dehydration unit 261 (FIGS. 1-4). The feed stream 10 may enter the dehydration unit 261 before entering the distillation tower 104, 204. The feed stream 10 enters the dehydration unit 261 before entering the heat exchanger 100 and/or the expander device 102. The dehydration unit 261 removes water from the feed stream 10 to prevent water from later presenting a problem in the heat exchanger 100, expander device 102, feed separator 103, or distillation tower 104, 204. The water can present a problem by forming a separate water phase (i.e., ice and/or hydrate) that plugs lines, equipment or negatively affects the distillation process. The dehydration unit 261 dehydrates the feed stream to a dew point sufficiently low to ensure a separate water phase will not form at any point downstream during the rest of the process. The dehydration unit may be any suitable dehydration mechanism, such as a molecular sieve or a glycol dehydration unit.

The system may include a filtering unit (not shown). The feed stream 10 may enter the filtering unit before entering the distillation tower 104, 204. The filtering unit may remove undesirable contaminants from the feed stream before the feed stream enters the distillation tower 104, 204. Depending on what contaminants are to be removed, the filtering unit may be before or after the dehydration unit 261 and/or before or after the heat exchanger 100.

The systems may include a line 12 (FIGS. 1-4). The line may also be referred to as an inlet channel 12. The feed stream 10 may be introduced into the distillation tower 104, 204 through the line 12. The line 12 may extend to the lower section 106 or the middle controlled freeze zone section 108 of the distillation tower 104, 204. For example, the line 12 may extend to the lower section 106 such that the feed stream 10 may enter the lower section 106 of the distillation tower 104, 204 (FIGS. 1-4). The line 12 may directly or indirectly extend to the lower section 106 or the middle controlled freeze zone section 108. The line 12 may extend to an outer surface of the distillation tower 104, 204 before entering the distillation tower 104, 204.

If the system includes the feed separator 103 (FIGS. 3-4), the line 12 may comprise a plurality of lines 12. Each line may be the same line as one of the lines that extends from the feed separator to a specific portion of the distillation tower 104, 204.

The lower section 106 is constructed and arranged to separate the feed stream 10 into an enriched contaminant bottom liquid stream (i.e., liquid stream) and a freezing zone vapor stream (i.e., vapor stream). The lower section 106 separates the feed stream at a temperature and pressure at which no solids form. The liquid stream may comprise a greater quantity of contaminants than of methane, e.g., carbon dioxide, hydrogen sulfide, ethane, propane, butane, hydrogen sulfide, aromatic hydrocarbons, or combinations thereof, in substantially liquid phase. The vapor stream may comprise a greater quantity of methane than of contaminants. In any case, the vapor stream is lighter than the liquid stream. As a result, the vapor stream rises from the lower section 106 and the liquid stream falls to the bottom of the lower section 106.

The lower section 106 may include and/or connect to equipment that separates the feed stream. The equipment may comprise any suitable equipment for separating methane from contaminants, such as one or more packed sections 181, or one or more distillation trays with perforations, downcomers, and weirs (FIGS. 1-4).

The equipment may include components that apply heat to the stream to form the vapor stream and the liquid stream. For example, the equipment may comprise a first reboiler 112 that applies heat to the stream. The first reboiler 112 may be located outside of the distillation tower 104, 204. The equipment may also comprise a second reboiler 172 that applies heat to the stream. The second reboiler 172 may be located outside of the distillation tower 104, 204. Line 117 may lead from the distillation tower to the second reboiler 172. Line 17 may lead from the second reboiler 172 to the distillation tower. Additional reboilers, set up similarly to the second reboiler described above, may also be used.

The first reboiler 112 may apply heat to the liquid stream that exits the lower section 106 through a liquid outlet 160 of the lower section 106. The liquid stream may travel from the liquid outlet 160 through line 28 to reach the first reboiler 112 (FIGS. 1-4). The amount of heat applied to the liquid stream by the first reboiler 112 can be increased to separate more methane from contaminants. The more heat applied by the reboiler 112 to the stream, the more methane separated from the liquid contaminants, though more contaminants will also be vaporized.

The first reboiler 112 may also apply heat to the stream within the distillation tower 104, 204. Specifically, the heat applied by the first reboiler 112 warms up the lower section 106. This heat travels up the lower section 106 and supplies heat to warm solids entering a melt tray assembly 139 (FIGS. 1-4) of the middle controlled freeze zone section 108 so that the solids form a liquid bath and/or slurry mix.

The second reboiler 172 may apply heat to the stream within the lower section 106. This heat may be applied closer to the middle controlled freeze zone section 108 than the heat applied by the first reboiler 112. As a result, the heat applied by the second reboiler 172 reaches the middle controlled freeze zone section 108 faster than the heat applied by the first reboiler 112. The second reboiler 172 may also help with energy integration. Some commercial applications may not have this second reboiler 172.

The equipment may include one or more chimney assemblies 135 (FIGS. 1-4). While falling to the bottom of the lower section 106, the liquid stream may encounter one or more of the chimney assemblies 135.

Each chimney assembly 135 includes a chimney tray 131 that collects the liquid stream within the lower section 106. The liquid stream that collects on the chimney tray 131 may be fed to the second reboiler 172. After the liquid stream is heated in the second reboiler 172, the stream may return to the middle controlled freeze zone section 108 to supply heat to the middle controlled freeze zone section 108 and/or the melt tray assembly 139. Unvaporized (or partially vaporized) stream exiting the second reboiler 172 may be fed back to the distillation tower 104, 204 below the chimney tray 131. Vapor stream exiting the second reboiler 172 may be routed under or above the chimney tray 131 when the vapor stream enters the distillation tower 104, 204.

The chimney tray 131 may include one or more chimneys 137. The chimney 137 serves as a channel that the vapor stream in the lower section 106 traverses. The vapor stream travels through an opening in the chimney tray 131 at the bottom of the chimney 137 to the top of the chimney 137. Each chimney 137 has attached to it a chimney cap 133. The chimney cap 133 covers a chimney top opening 138 of the chimney 137. The chimney cap 133 prevents the liquid stream from entering the chimney 137. The vapor stream exits the chimney assembly 135 via the chimney top opening 138.

After falling to the bottom of the lower section 106, the liquid stream exits the distillation tower 104, 204 through the liquid outlet 160. The liquid outlet 160 is within the lower section 106 (FIGS. 1-4). The liquid outlet 160 may be located at the bottom of the lower section 106.

After exiting through the liquid outlet 160, the feed stream may travel via line 28 to the first reboiler 112. The feed stream may be heated by the first reboiler 112 and vapor may then re-enter the lower section 106 through line 30. Unvaporized liquid may continue out of the distillation process via line 24.

The system may include an expander device 114 (FIGS. 1-4). After entering line 24, the heated liquid stream may be expanded in the expander device 114. The expander device 114 may be any suitable device, such as a valve. The valve 114 may be any suitable valve, such as a J-T valve.

The system may include a heat exchanger 116 (FIGS. 1-4). The liquid stream heated by the first reboiler 112 may be cooled or heated by the heat exchanger 116 and may exit the system via line 26. The heat exchanger 116 may be a direct heat exchanger or an indirect heat exchanger. The heat exchanger 116 may comprise any suitable heat exchanger.

The vapor stream in the lower section 106 rises from the lower section 106 to the middle controlled freeze zone section 108. The middle controlled freeze zone section 108 is maintained to receive a freezing zone liquid stream to form the solid and the vapor stream (i.e., hydrocarbon-enriched vapor stream) in the middle controlled freeze zone section 108. The middle controlled freeze zone section 108 is constructed and arranged to separate the feed stream 10 introduced into the middle controlled freeze zone section into a solid and a vapor stream. The solid and the vapor stream are formed in the middle controlled freeze zone section 108 when the freezing zone liquid stream is injected into the middle controlled freeze zone section 108 at a temperature and pressure at which the solid and vapor stream form. The solid may be comprised more of contaminants than of methane. The vapor stream may comprise more methane than contaminants.

The middle controlled freeze zone section 108 includes a lower section 40 and an upper section 39. The lower section 40 is primarily but may not exclusively be a heating section of the middle controlled freeze zone section 108. The upper section 39 is primarily but may not exclusively be a cooling section of the middle controlled freeze zone section 108. The temperature and pressure of the upper section 39 are chosen so that the solid can form in the middle controlled freeze zone section 108.

The middle controlled freeze zone section 108 may comprise a melt tray assembly 139 that is maintained in the middle controlled freeze zone section 108. The melt tray assembly 139 is within the lower section 40 of the middle controlled freeze zone section 108. The melt tray assembly 139 is not within the upper section 39 of the middle controlled freeze zone section 108.

The melt tray assembly 139 (FIG. 5) is constructed and arranged to melt a solid formed in the middle controlled freeze zone section 108. When the warm vapor stream rises from the lower section 106 to the middle controlled freeze zone section 108, the vapor stream immediately encounters the melt tray assembly 139 and supplies heat to melt the solid. The melt tray assembly 139 may comprise at least one of a melt tray 118, a bubble cap 132, a liquid 130, and heat mechanism(s) 134.

The melt tray 118 may collect a liquid bath and/or slurry mix. The melt tray 118 divides at least a portion of the middle controlled freeze zone section 108 from the lower section 106. The melt tray 118 is at the bottom 45 of the middle controlled freeze zone section 108.

In FIGS. 1-4, the melt tray 118 is depicted as a conventional melt tray design having one or more bubble caps 132. The bubble caps 132 may act as a channel for the vapor stream rising from the lower section 106 to the middle controlled freeze zone section 108. The bubble cap 132 may provide a path for the vapor stream up the riser 140 and then down and around the riser 140 to the melt tray 118. The riser 140 is covered by a cap 141. The cap 141 prevents the liquid 130 from travelling into the riser 140. The cap 141 helps prevent solids from travelling into the riser 140. The vapor stream's traversal through the bubble cap 132 allows the vapor stream to transfer heat to the liquid 130 within the melt tray assembly 139.

One or more heat mechanisms 134 may further heat up the liquid 130 to facilitate melting of the solids into a liquid and/or slurry mix in the lower section 40. The heat mechanism(s) 134 may be located anywhere within the melt tray assembly 139. For example, as shown in FIGS. 1-4, a heat mechanism 134 may be located around the bubble caps 132. The heat mechanism 134 may be any suitable mechanism, such as a heat coil. The heat source of the heat mechanism 134 may be any suitable heat source.

The liquid 130 in the melt tray assembly is heated by the vapor stream. The liquid 130 may also be heated by the one or more heat mechanisms 134. The liquid 130 helps melt the solids formed in the middle controlled freeze zone section 108 into a liquid and/or slurry mix in the lower section 40. Specifically, the heat transferred by the vapor stream heats up the liquid, thereby enabling the heat to melt the solids. The liquid 130 is at a level sufficient to melt the solids.

The middle controlled freeze zone section 108 may also comprise a spray assembly 129. The spray assembly 129 cools the vapor stream that rises from the lower section 40. The spray assembly 129 sprays liquid, which is cooler than the vapor stream, on the vapor stream to cool the vapor stream. The spray assembly 129 is within the upper section 39. The spray assembly 129 is not within the lower section 40. The spray assembly 129 is above the melt tray assembly 139. In other words, the melt tray assembly 139 is below the spray assembly 129.

The spray assembly 129 may also include a spray pump 128 (FIGS. 1-4). The spray pump 128 pumps the liquid to the spray nozzle assembly 120 having a plurality of spray nozzles disposed thereon. Instead of a spray pump 128, gravity may induce flow in the liquid.

The solid formed in the middle controlled freeze zone section 108, falls toward the melt tray assembly 139. Most, if not all, solids do not fall toward the controlled freeze zone wall because of the above-described arrangement of the spray nozzle assembly 120. The solid formed in the middle controlled freeze zone section 108 forms the liquid/slurry mix or liquid bath of the lower section 40 in the melt tray assembly 139. The liquid/slurry mix or liquid bath flows from the middle controlled freeze zone section 108 to the lower section 106.

The liquid/slurry mix flows from the bottom of the middle controlled freeze zone section 108 to the lower section 106 via a line 22 (FIGS. 1-4). The line 22 may be an exterior line. The line 22 may extend from the distillation tower 104, 204. The line 22 may extend from the middle controlled freeze zone section 108. The line may extend from the lower section 106. The line 22 may extend from an outer surface of the distillation tower 104, 204.

The temperature in the middle controlled freeze zone section 108 cools down as the vapor stream travels from the bottom of the middle controlled freeze zone section 108 to the top of the middle controlled freeze zone section 108. The methane in the vapor stream rises from the middle controlled freeze zone section 108 to the upper section 110. Some contaminants may remain in the methane and also rise. The contaminants in the vapor stream tend to condense or solidify with the colder temperatures and fall to the bottom of the middle controlled freeze zone section 108.

The solids form the liquid and/or slurry mix when in the liquid 130. The liquid and/or slurry mix flows from the middle controlled freeze zone section 108 to the lower distillation section 106. The liquid and/or slurry mix flows from the bottom of the middle controlled freeze zone section 108 to the top of the lower section 106 via a line 22 (FIGS. 1-4). The line 22 may be an exterior line. The line 22 may extend from the distillation tower 104, 204. The line 22 may extend from the middle controlled freeze zone section 108. The line may extend to the lower section 106.

The vapor stream that rises in the middle controlled freeze zone section 108 and does not form solids or otherwise fall to the bottom of the middle controlled freeze zone section 108, rises to the upper section 110. The upper section 110 operates at a temperature and pressure and contaminant concentration at which no solid forms. The upper section 110 is constructed and arranged to cool the vapor stream to separate the methane from the contaminants Reflux in the upper section 110 cools the vapor stream. The reflux is introduced into the upper section 110 via line 18. Line 18 may extend to the upper section 110. Line 18 may extend from an outer surface of the distillation tower 104, 204.

After contacting the reflux in the upper section 110, the feed stream forms a vapor stream and a liquid stream. The vapor stream mainly comprises methane. The liquid stream comprises relatively more contaminants. The vapor stream rises in the upper section 110 and the liquid falls to a bottom of the upper section 110.

To facilitate separation of the methane from the contaminants when the stream contacts the reflux, the upper section 110 may include one or more mass transfer devices 176. Each mass transfer device 176 helps separate the methane from the contaminants. Each mass transfer device 176 may comprise any suitable separation device, such as a tray with perforations, a section of random or structured packing, etc., to facilitate contact of the vapor and liquid phases.

After rising, the vapor stream may exit the distillation tower 104, 204 through line 14. The line 14 may emanate from an upper part of the upper section 110. The line 14 may extend from an outer surface of the upper section 110.

From line 14, the vapor stream may enter a condenser 122. The condenser 122 cools the vapor stream to form a cooled stream. The condenser 122 at least partially condenses the stream.

After exiting the condenser 122, the cooled stream may enter a separator 124. The separator 124 separates the vapor stream into liquid and vapor streams. The separator may be any suitable separator that can separate a stream into liquid and vapor streams, such as a reflux drum.

Once separated, the vapor stream may exit the separator 124 as sales product. The sales product may travel through line 16 for subsequent sale to a pipeline and/or condensation to be liquefied natural gas.

Once separated, the liquid stream may return to the upper section 110 through line 18 as the reflux. The reflux may travel to the upper section 110 via any suitable mechanism, such as a reflux pump 150 (FIGS. 1 and 3) or gravity (FIGS. 2 and 4).

The liquid stream (i.e., freezing zone liquid stream) that falls to the bottom of the upper section 110 collects at the bottom of the upper section 110. The liquid may collect on tray 183 (FIGS. 1 and 3) or at the bottommost portion of the upper section 110 (FIGS. 2 and 4). The collected liquid may exit the distillation tower 104, 204 through line 20 (FIGS. 1 and 3) or outlet 260 (FIGS. 2 and 4). The line 20 may emanate from the upper section 110. The line 20 may emanate from a bottom end of the upper section 110. The line 20 may extend from an outer surface of the upper section 110.

The line 20 and/or outlet 260 connect to a line 41. The line 41 leads to the spray assembly 129 in the middle controlled freeze zone section 108. The line 41 emanates from the holding vessel 126. The line 41 may extend to an outer surface of the middle controlled freeze zone section 108.

The line 20 and/or outlet 260 may directly or indirectly (FIGS. 1-4) connect to the line 41. When the line 20 and/or outlet 260 directly connect to the line 41, the liquid spray may be pumped to the spray nozzle assembly 120 via any suitable mechanism, such as the spray pump 128 or gravity. When the line 20 and/or outlet 260 indirectly connect to the line 41, the lines 20, 41 and/or outlet 260 and line 41 may directly connect to a holding vessel 126 (FIGS. 1 and 3). The holding vessel 126 may house at least some of the liquid before it is sprayed by the nozzle(s). The liquid may be pumped from the holding vessel 126 to the spray nozzle assembly 120 via any suitable mechanism, such as the spray pump 128 (FIGS. 1-4) or gravity. The holding vessel 126 may be needed when there is not a sufficient amount of liquid stream at the bottom of the upper section 110 to feed the spray nozzle assembly 120.

Figure 5:
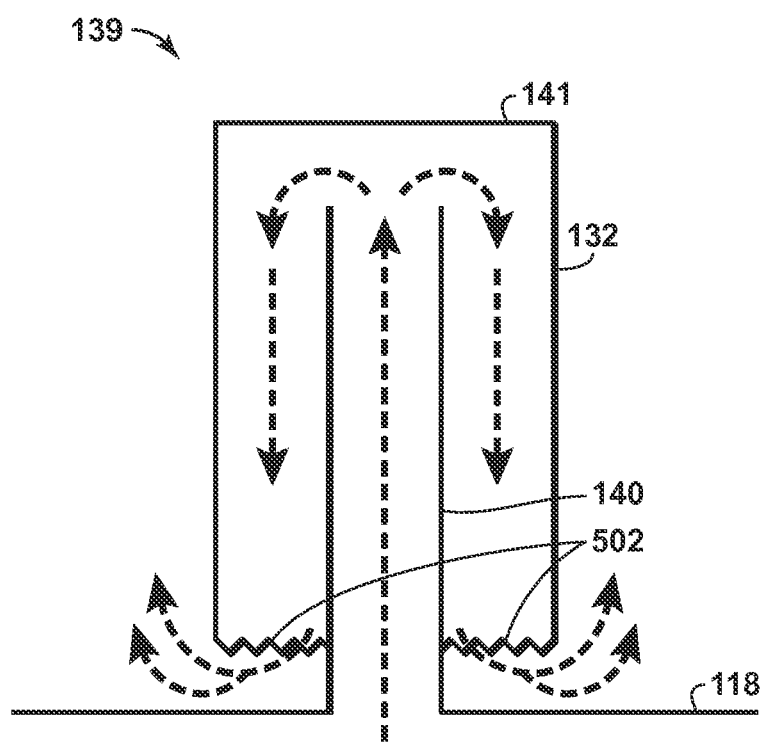
FIG. 5 is a schematic diagram of a melt tray assembly having a bubble cap.

FIG. 5 is a schematic diagram of a melt tray assembly 139, e.g., the melt tray assembly having a melt tray 118 and a bubble cap 132. The components of FIG. 5 may be substantially the same as the corresponding components of FIGS. 1-4. Dashed lines illustrate the flow of vapor through the melt tray assembly 139. As discussed previously, when the warm vapor stream rises, the vapor stream immediately encounters the melt tray assembly 139 and transfers heat to the melt tray 118, the cap 141, and the bubble cap 132 in order to warm any surrounding liquid, e.g., a liquid bath and/or slurry mix. The bubble cap 132 acts as a channel for the vapor stream as it passes through the melt tray assembly 139. The riser 140 directs the vapor vertically upwards through the melt tray assembly 139, the cap 141 stops the vertical ascent of the vapor, and the bubble cap 132 directs the vapor stream down and around the riser 140. The vapor stream exits the bubble cap 132 at vapor outlets 502. Consequently, heat exchange or heat transfer between the melt tray assembly 139 and any surrounding liquid occurs as the vapor stream passes downwards through the liquid along the bubble cap 132 outer surface.

Those of skill in the art will appreciate that the riser 140 of the melt tray assembly 139 is not effective at transferring heat to the surrounding liquid, e.g., a liquid bath and/or slurry mix in the lower section 40. Further, the melt tray assembly 139 may result in maldistribution of the warm vapor bubbles entering the surrounding liquid with respect to the volume of the distillation tower 104, 204. These inefficiencies may separately or in combination reduce the effectiveness of warm vapor mixing across the available liquid volume.

Figure 6A:
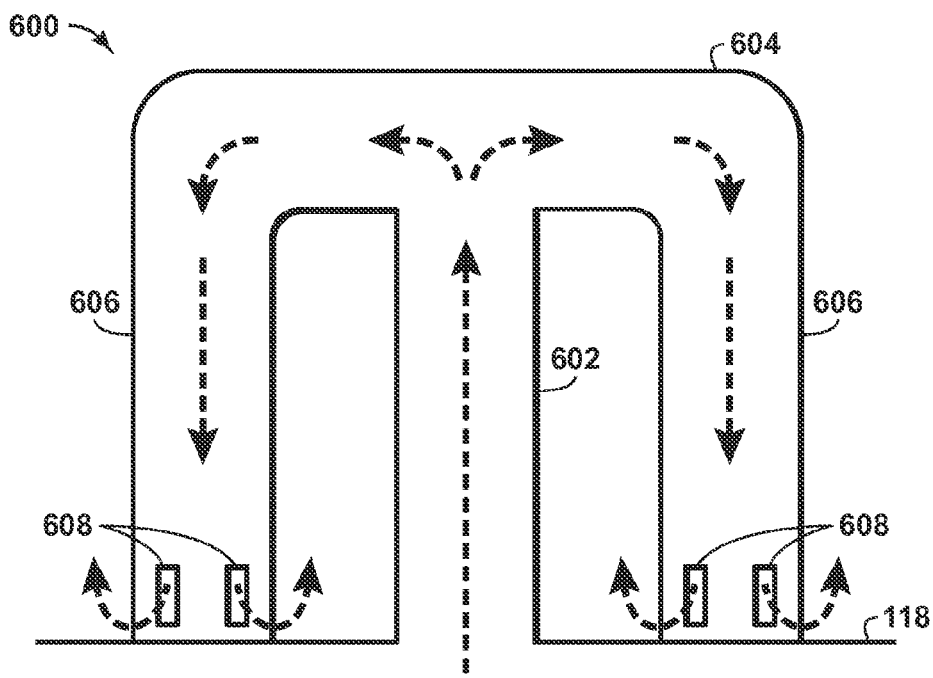
FIG. 6A is a side view schematic diagram of an embodiment of a collector tray apparatus for a controlled freeze zone distillation tower.
Figure 6B:
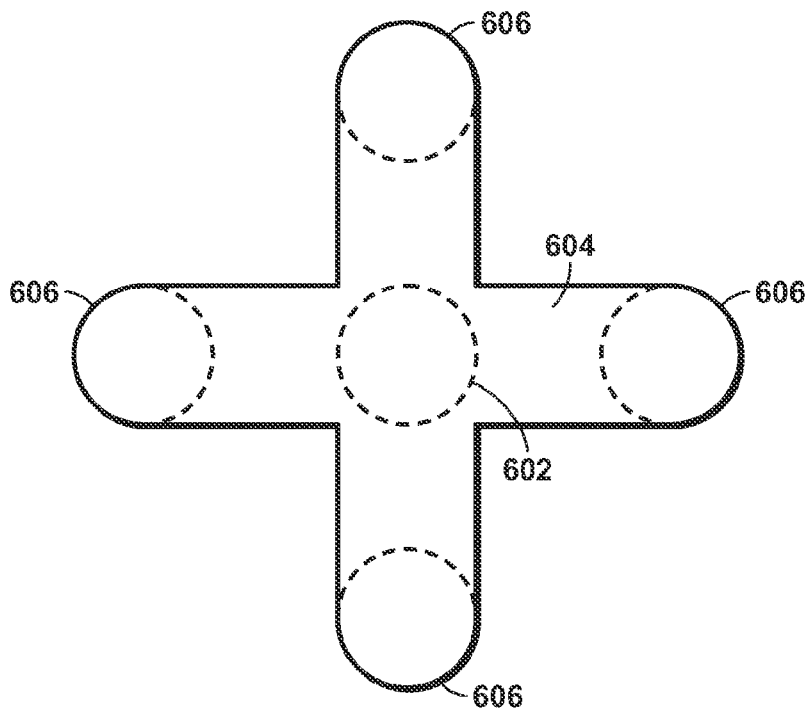
FIG. 6B is a top view schematic diagram of an embodiment of the collector tray apparatus of FIG. 6A.

FIG. 6A is a side view schematic diagram of an embodiment of a collector tray apparatus 600 for a controlled freeze zone distillation tower 104, 204. FIG. 6B is a top view schematic diagram of an embodiment of the collector tray apparatus 600 of FIG. 6A. The components of FIGS. 6A and 6B may be substantially the same as the corresponding components of FIGS. 1-5 except as otherwise noted. Dashed lines illustrate the flow of vapor through the collector tray apparatus 600. The collector tray apparatus 600 has a vapor riser 602 having a substantially vertical trunk configured to pass the vapor from below a deck 118 in a substantially upwardly vertical direction into an upper end of the liquid bath and/or the lower section 40. A vapor distribution cap 604 is disposed at an upper or terminal end of the vapor riser 602. The vapor distribution cap 604 splits and/or distributes the vapor stream into four separate portions or branch streams via branches or branching arms 606. The branching arms 606 redirect the branch streams of vapor to pass in a substantially vertically downwards direction through the liquid bath and/or lower section 40 to vapor outlets 608. The vapor outlets 608 may comprise standard perforations, holes, nozzles, and/or directional slotting to promote a swirling pattern to the vapor exiting the branching arms 606, e.g., to create turbulence, eddies, or other tumultuous flow characteristics for vapor sparged, released, or otherwise introduced into the liquid bath. Additionally, the vapor outlets 608 may be uniformly distributed around the branching arms 606 or may be placed symmetrically or asymmetrically at varying orientations or elevations along the branching arms 606 in order to obtain the desired vapor flow characteristics. Creating flow characteristics in this manner may improve mixing between the phases and heat transfer.

Unlike the riser 140 in melt tray assembly 139, the vapor riser 602 and the branching arms 606 in the collector tray 600 do not share a common wall. Thus, heat exchange may occur across the full length and/or outer surface area of the vapor riser 602 as well as across the full length and/or outer surface area of each of the branching arms 606. Further, heat exchange with the liquid and/or slurry mix contained in the lower section 40 of FIGS. 1-4 may occur in a region between the vapor riser 602 and the branching arms 606.

The region between the vapor riser 602 and the branching arms 606 may be substantially filled with liquid and/or slurry mix. Vapor passing through the branching arms 606 may not contact the vapor riser 602, and vapor exiting the vapor outlets 608 may not substantially contact the vapor riser 602. In this manner, the vapor riser 602 may comprise a substantially vertical heat transfer section configured to pass the vapor substantially upwards through the collector tray apparatus 600. Similarly, the branching arms 606 may comprise a substantially vertical heat transfer section configured to pass the vapor substantially downwards through the collector tray apparatus 600. The vapor outlets 608 may be below the substantially vertical heat transfer sections of the vapor riser 602 and/or the branching arms 606.

Some embodiments include various enhancements to the surface areas of the inner diameter and/or outer diameter of the vapor riser 602, the branching arms 606, or both. For example, some embodiments add one or more flow controlling devices, and/or ribs, fins, channels, grooves, turbulators, or other irregular surfaces to the inner diameter and/or outer diameter of the vapor riser 602, the branching arms 606, or both to obtain the desired flow characteristics, e.g., enhanced swirling, enhanced speed of flow, etc. Still other embodiments may include various chemical treatments, e.g., superhydrophobic coatings, in similar manners for similar effects. Additional embodiments may vary the geometry of the vapor riser 602, the branching arms 606, or both. For example, some embodiments vary the diameter of the vapor riser 602, the branching arms 606, or both along the path of vapor flow. The diameter of the branching arms 606 may be different, e.g., smaller, than the diameter of the vapor riser 602, and in some embodiments the diameter may vary amongst branching arms 606.

The collector tray apparatus 600 may include one or more secondary heating elements (not depicted), e.g., electrical heating elements. Some embodiments may incorporate the secondary heaters into the overall collector tray apparatus 600, e.g., the vapor riser 602, the distribution cap 604, the branching arms 606, or combinations thereof (collectively, "applicable component(s)"), to supply supplemental heating. The secondary heating element(s) may be ribbon heathers, tubular coils, coil-in-plate heaters, heating rods, wrapped and/or coiled around the applicable component(s), and may be oriented longitudinally along the length, perpendicular to the length, or via any pathway covering the required surface area to provide secondary heating control. The secondary heating element(s) may be embedded into and/or integrally disposed within the surface of the applicable component(s). Further, the secondary heating elements may be placed on the outer surface of the applicable component(s) to directly heat the liquid bath, placed on the inner surface or within the inner volume of the of the applicable component(s) to warm the vapor passing through, or a combination thereof. Secondary heating element(s) may include elongated rods or similar structures attached to the applicable component(s) and/or may be wrapped or embedded within applicable component(s). For example, self-regulating type cables may be applied and/or attached to the applicable component(s). Such embodiments may return current in the conductor via the inside surface of the heated branch/piping. Such embodiments may concentrate current in the tube and dissipate heat into the attached component(s) to increase the temperature of the component(s) and/or the vapor passing therethrough. Embodiments including secondary heating elements, e.g., wrapped and/or coiled electrical heating elements may include one or more electrically and/or thermally non-conductive transition section(s) to prevent electrical grounding and/or excessive heat transfer to the remaining components of the collector tray apparatus 600. Some embodiments include a controller coupled to the secondary heating elements and configured to turn on one or more secondary heating elements to raise the temperature of the liquid bath, the vapor, or both, on an as-needed basis to obtain the desired temperature characteristics. Such controllers may operate and/or energize the secondary heating elements individually, in one or more groups or banks alternately or in unison, or all in unison. Further, the secondary heating elements may have one or more modes of operation, such as a high heat and a low heat mode, etc., and the controller may operate the secondary heating elements in any combination or permutation to obtain the desired performance characteristics.

Figure 7:
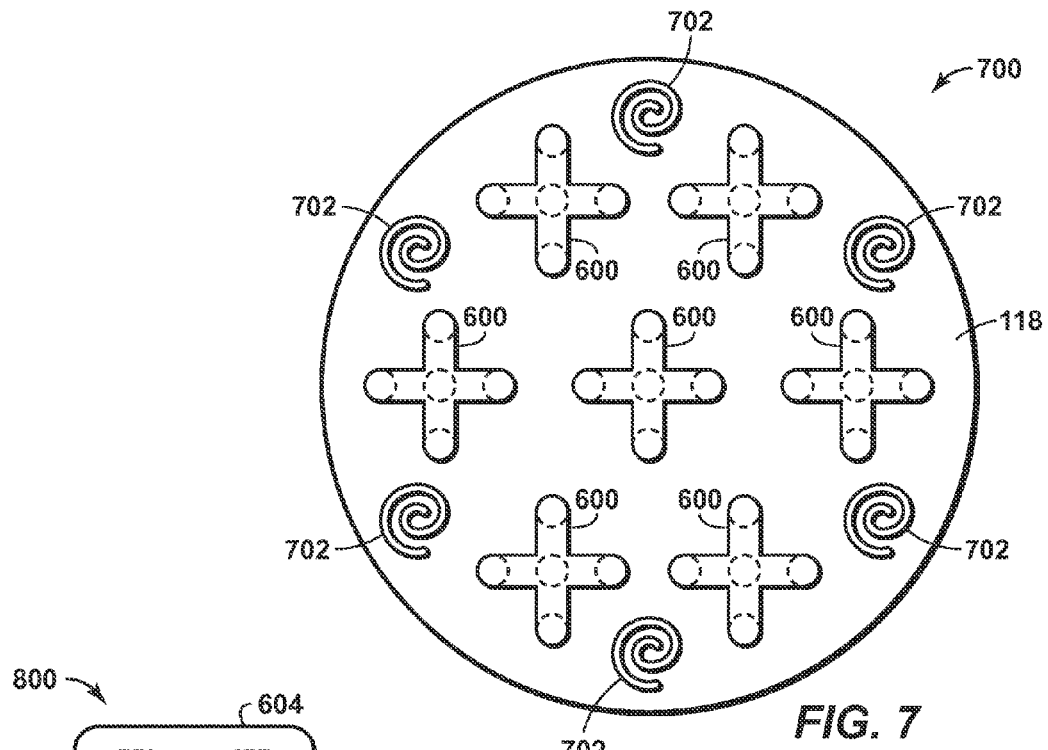
FIG. 7 is a top view schematic diagram of an embodiment of a collector tray assembly having a plurality of collector tray apparatuses positioned on the deck.

FIG. 7 is a top view schematic diagram of an embodiment of a collector tray assembly 700 having a plurality of collector tray apparatuses 600 positioned on the melt tray 118. The components of FIG. 7 may be substantially the same as the corresponding components of FIGS. 1-6B except as otherwise noted. The collector tray assembly 700 further includes a plurality of heating elements 702 disposed on the melt tray 118. The heating elements 702 may be used alternatively to or in conjunction with the collector tray apparatus 600 secondary heating elements described above with respect to FIGS. 6A and 6B. Those of skill in the art will appreciate that a varying number of heating elements 702 and/or collector tray apparatuses 600 may be employed on an as-needed basis to obtain the desired performance characteristics. Further, some embodiments may vary the height of one or more collector tray apparatuses 600 with respect to other collector tray apparatuses 600, one or more vapor outlets 608 on the same and/or amongst a plurality of collector tray apparatuses 600, etc., in order to obtain the desired performance characteristics.

Figure 8A:
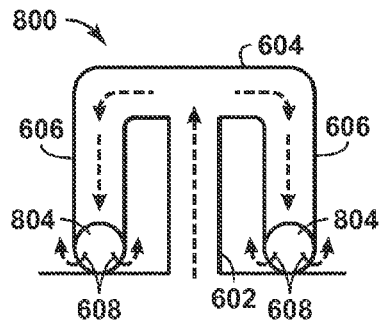
FIG. 8A is a side view schematic diagram of another embodiment of a collector tray apparatus for a controlled freeze zone distillation tower.
Figure 8B:
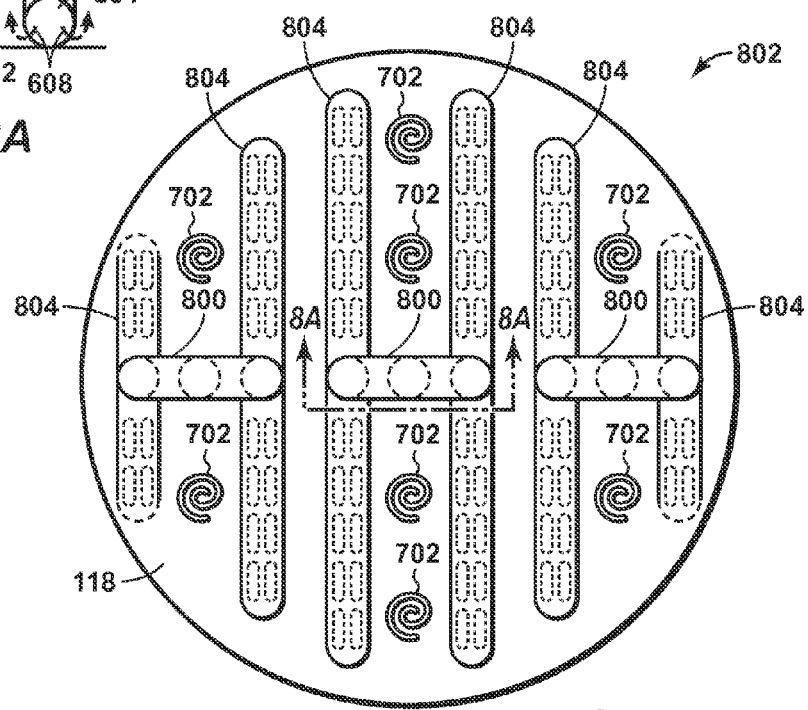
FIG. 8B is a top view schematic diagram of an embodiment of a collector tray assembly having a plurality of collector tray apparatuses of FIG. 8A.

FIG. 8A is a side view schematic diagram of another embodiment of a collector tray apparatus 800 for a controlled freeze zone distillation tower 104, 204. Dashed lines illustrate the flow of vapor through the collector tray apparatus 800. FIG. 8B is a top view schematic diagram of an embodiment of a collector tray assembly 802 having a plurality of collector tray apparatuses 800 of FIG. 8A. The components of FIGS. 8A and 8B may be substantially the same as the corresponding components of FIGS. 1-7 except as otherwise noted.

The collector tray apparatus 800 of FIG. 8A includes a vapor riser 602, a distribution cap 604, and branching arms 606. The collector tray apparatus 800 further includes laterally extending sparger sections 804. Although depicted with equal diameters, those of skill in the art will appreciate that the diameter of the sparger sections 804 may be optionally varied to obtain the desired performance characteristics. The sparger sections 804 include vapor outlets 608 spaced longitudinally along a lower side of the sparger sections 804. Vapor passed substantially downward through the branching arms 606 may be passed laterally along the sparger sections 804 as sparger streams and sparged through the vapor outlets 608 into the surrounding liquid and/or slurry mix contained in the lower section 40. Although depicted symmetrically, those of skill in the art will appreciate that the vapor outlets 608 may be uniformly distributed around the sparger sections 804 or may be placed symmetrically or asymmetrically at varying orientations or elevations along the sparger sections 804 in order to obtain the desired vapor flow characteristics.

The collector tray assembly 802 of FIG. 8B having a plurality of collector tray apparatuses 800 positioned on the melt tray 118. The collector tray assembly 802 further includes a plurality of heating elements 702 disposed on the melt tray 118. The heating elements 702 may be used alternatively to or in conjunction with the collector tray apparatus 800 secondary heating elements described above with respect to FIGS. 6A and 6B. Those of skill in the art will appreciate that a varying number of heating elements 702 and/or collector tray apparatuses 800 may be employed on an as-needed basis to obtain the desired performance characteristics. As depicted, the sparger sections 804 may vary in lateral length both on an individual collector tray apparatus 800 and amongst collector tray apparatuses 800. Further, some embodiments may vary the height of one or more collector tray apparatuses 800 with respect to other collector tray apparatuses 800, one or more sparger sections 804 with respect to other sparger sections 804, one or more vapor outlets 608 (depicted with dashed lines) on the same and/or amongst a plurality of collector tray apparatuses 800, etc., in order to obtain the desired performance characteristics.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A cryogenic distillation tower system for separating acid gases from hydrocarbons in a raw gas stream, comprising:
   a controlled freezing zone configured to separate the raw gas stream into an overhead methane gas stream and a substantially solid material comprised of precipitated carbon dioxide;
   a lower distillation zone configured to receive a bottoms stream comprising acid gases in liquid phase from the controlled freezing zone, and further configured to pass a vapor separated from the acid gases, wherein the acid gas comprises carbon dioxide, hydrogen sulfide, ethane, propane, butane, aromatic hydrocarbons, or combinations thereof, in substantially liquid phase;
   a slurry mix zone below the controlled freezing zone configured to house a liquid bath, and wherein the slurry mix zone is configured to receive the substantially solid material from the controlled freezing zone; and
   a tray assembly below the slurry mix zone and above the lower distillation zone, wherein the tray assembly comprises:
      a deck at a lower end of the slurry mix zone comprising:
         at least one vapor riser, wherein the at least one vapor riser comprises:
            a substantially vertical heat transfer section configured to pass the vapor from the lower distillation zone substantially upwards through the slurry mix zone; and
         at least one vapor distribution cap that is disposed at an upper end of the vapor riser and comprises a plurality of branching arms, wherein the vapor distribution cap is configured to split the vapor stream into a plurality of branch streams to pass the plurality of branch streams substantially downwards through the slurry mix zone to one or more vapor outlets, wherein the vapor outlets are below the heat transfer section;
         wherein the vapor riser and the plurality of branching arms do not share a common wall.

2. The cryogenic distillation tower system of claim 1, wherein each of the plurality of branching arms comprises a plurality of branch vapor outlets.

3. The cryogenic distillation tower system of claim 2, wherein each of the plurality of branching arms comprises a laterally extending sparger section, and wherein the plurality of branch vapor outlets are disposed on the sparger section.

4. The cryogenic distillation tower system of claim 3, wherein the plurality of branch vapor outlets are spaced to create a substantially uniform distribution of vapor with respect to the slurry mix zone.

5. The cryogenic distillation tower system of claim 1, wherein the deck comprises at least one electric heating element.

6. The cryogenic distillation tower system of claim 5, wherein the system further comprises an electric heating element controller operatively coupled to the at least one electric heating element, and where the system is further configured to selectively operate the at least one electric heating element.

7. The cryogenic distillation tower system of claim 1, wherein the vapor outlets are configured to facilitate turbulent flow for the vapor passed through the vapor outlets into the slurry mix zone.

8. The cryogenic distillation tower system of claim 1, wherein the tray assembly comprises a plurality of vapor risers, and wherein at least one vapor outlet of a first vapor riser is disposed at a different height within the slurry mix zone than a vapor outlet of a second vapor riser.

9. A method for separating acid gases from a raw gas feed stream in a cryogenic distillation tower, comprising:
   passing a feed stream into a controlled freeze zone section of a distillation tower, the feed stream comprising a hydrocarbon and a contaminant;
   contacting the feed stream in the controlled freeze zone section with a freezing zone liquid stream, comprising the hydrocarbon, at a temperature and pressure at which a solid, comprising the contaminant, and a hydrocarbon-enriched vapor stream, comprising the hydrocarbon, form;
   passing the solid into a liquid bath section of the distillation tower, wherein the temperature of the liquid bath is higher than the temperature of the solid;
   passing a vapor stream from a lower distillation section of the distillation tower into the liquid bath section, wherein the temperature of the vapor stream is higher than the temperature of the liquid bath, and wherein passing the vapor stream from the lower distillation section into the liquid bath section comprises:

passing the vapor stream in a substantially vertically upwards direction through a vapor riser in the liquid bath section, wherein passing comprises exchanging heat from the vapor stream to the liquid bath section;

redirecting the vapor stream from the vapor riser such that it passes in a substantially vertically downwards direction through the liquid bath section, wherein redirecting the vapor stream comprises splitting the vapor stream into a plurality of branch streams and wherein passing comprises exchanging heat from the plurality of branch streams to the liquid bath section, and wherein the vapor passing through the branching arms does not contact the vapor riser; and sparging the plurality of branch streams into the liquid bath section at a lower end of the liquid bath section.

10. The method of claim 9, further comprising raising the temperature of the liquid bath section.

11. The method of claim 10, wherein raising the temperature of the liquid bath section comprises turning on at least one electric heating element.

12. The method of claim 11, wherein the at least one electric heating element is one electric heating element among a bank of electric heating elements, and wherein the bank of electric heating elements is energized in unison.

13. The method of claim 9, wherein sparging comprises:
flowing the plurality of branch streams so as to promote a non-linear pattern to the vapor being sparged.

14. The method of claim 9, further comprising splitting each of the plurality of branch streams into at least two sparger streams before sparging the vapor stream into the liquid bath section.

15. A tray assembly for use in a distillation tower, comprising:
a deck configured to support a liquid bath on a top side of the deck and a mixture of a vapor and a liquid on a bottom side of the deck, wherein the deck comprises:
a plurality of electrical heating elements; and
a plurality of vapor risers, wherein each vapor riser comprises:
a vertical trunk configured to pass the vapor from below the deck into an upper end of the liquid bath;
a vapor distribution cap disposed at a top of the vertical trunk;
at least two branches coupled to the vapor distribution cap and configured to pass the vapor from the vapor distribution cap to a lower end of the liquid bath; wherein the at least two branches and the vertical trunk do not share a common wall;
a vapor outlet at a terminal end of each of the at least two branches, wherein each vapor outlet is configured to sparge the vapor into the liquid bath.

16. The tray assembly of claim 15, wherein at least one of the plurality of electrical heating elements is disposed on a first vapor riser of the plurality of vapor risers, a first branch of the at least two branches, or both.

17. The tray assembly of claim 15, wherein each of the at least two branches comprises a sparger section extending away from the branch, wherein each vapor outlet is disposed on a respective sparger section, and wherein the upper end of at least two vapor risers, the vapor outlets, or both are disposed at different heights with respect to the deck.

* * * * *